United States Patent [19]

Marino

[11] 4,436,466

[45] Mar. 13, 1984

[54] CARGO RESTRAINING APPARATUS

[76] Inventor: Frank J. Marino, 17 Battery Pl., New York, N.Y. 10017

[21] Appl. No.: 289,265

[22] Filed: Aug. 3, 1981

[51] Int. Cl.³ .................. B60P 7/14; B61D 45/00; B63B 25/24
[52] U.S. Cl. .................................... 410/118; 410/99; 410/121; 410/129
[58] Field of Search ............... 410/117, 118, 121, 127, 410/129, 140, 90, 98, 99, 155, 156

[56] References Cited

U.S. PATENT DOCUMENTS

| | | | |
|---|---|---|---|
| 276,053 | 4/1883 | Lewes | 410/129 X |
| 1,703,495 | 2/1929 | MacChesney et al. | 410/98 |
| 1,772,902 | 8/1930 | Knowlton et al. | 410/98 |
| 2,669,402 | 2/1954 | Del Mar | 410/118 |
| 4,167,144 | 9/1979 | Martin et al. | 410/117 |
| 4,168,667 | 9/1979 | Loomis | 410/118 |
| 4,265,577 | 5/1981 | Loomis | 410/118 |

FOREIGN PATENT DOCUMENTS 668050  8/1963  Canada .............................. 410/117

*Primary Examiner*—Robert B. Reeves
*Assistant Examiner*—Howard Beltran
*Attorney, Agent, or Firm*—Bell, Seltzer, Park & Gibson

[57] ABSTRACT

A cargo restraining apparatus is disclosed which is designed to confine and restrain a load during shipment in a transport vehicle, and which comprises a rectangular panel, and a continuous flexible loading strap mounted in a figure eight pattern on one side of the panel. A tie strap is mounted at each of the four corners of the panel for securing the panel to an adjacent anchoring structure in the transport vehicle, and a belt and buckle arrangement is provided for drawing the ends of the strap together to thereby adjust its length. When operatively positioned against one end of the load, the panel acts to spread the contact pressure over a relatively large area, and the loading strap serves to reinforce and support the panel.

7 Claims, 8 Drawing Figures

U.S. Patent   Mar. 13, 1984   4,436,466
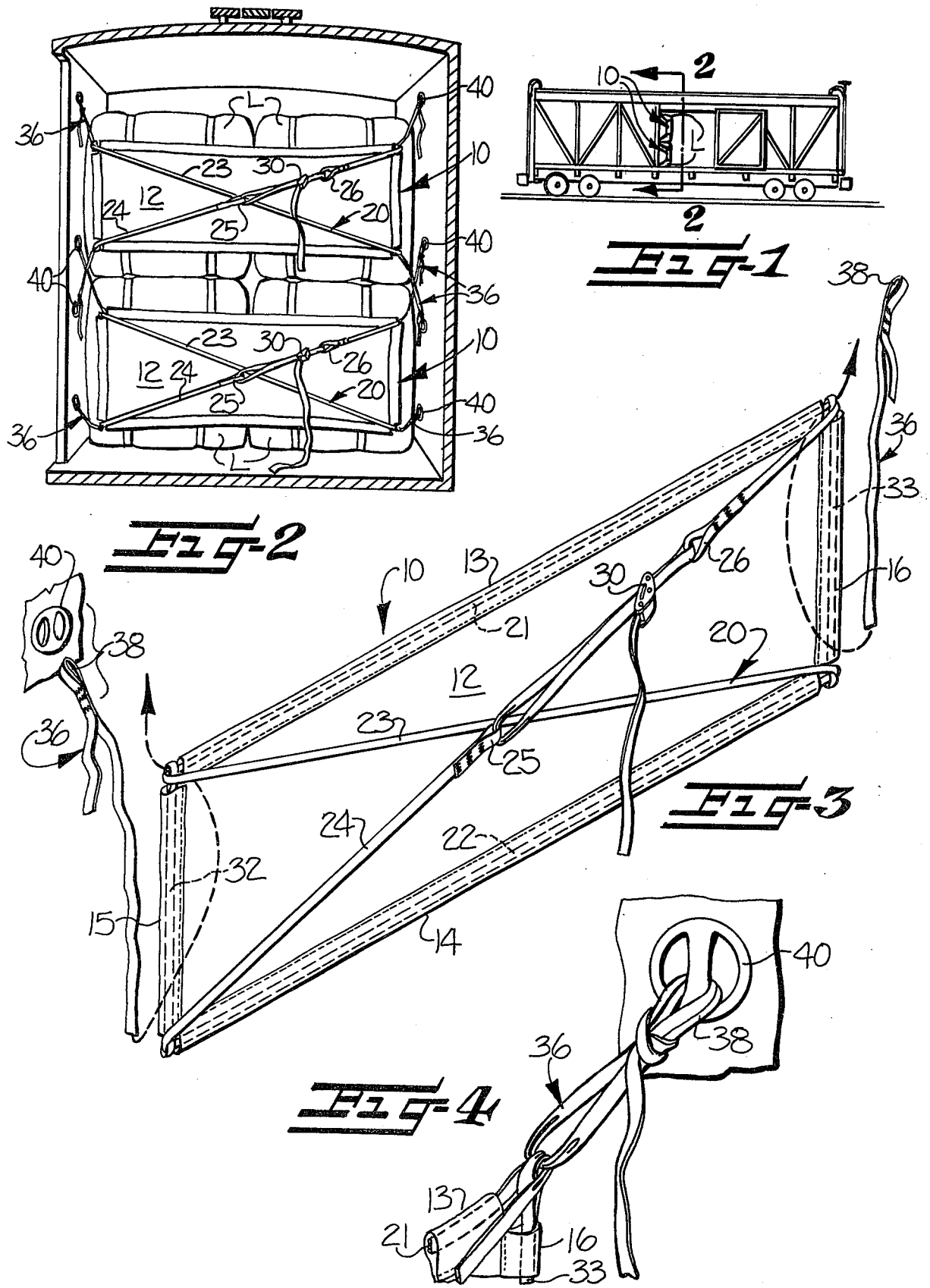

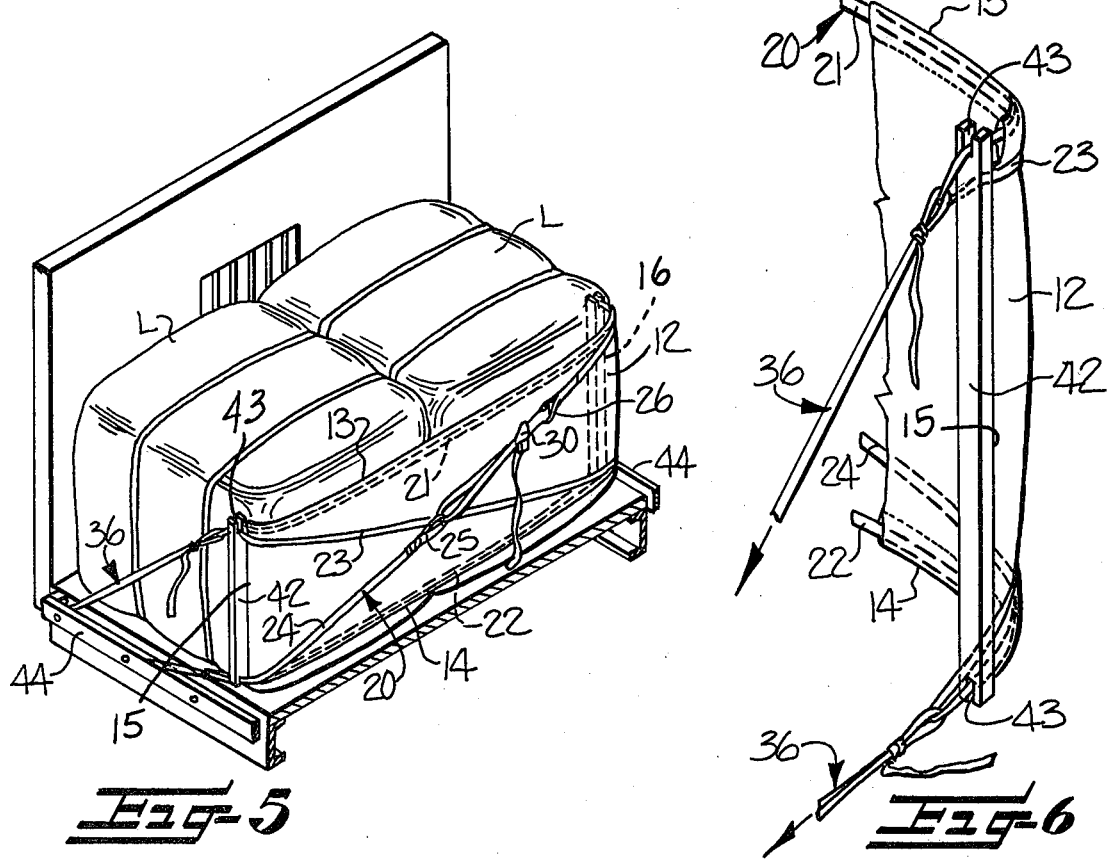
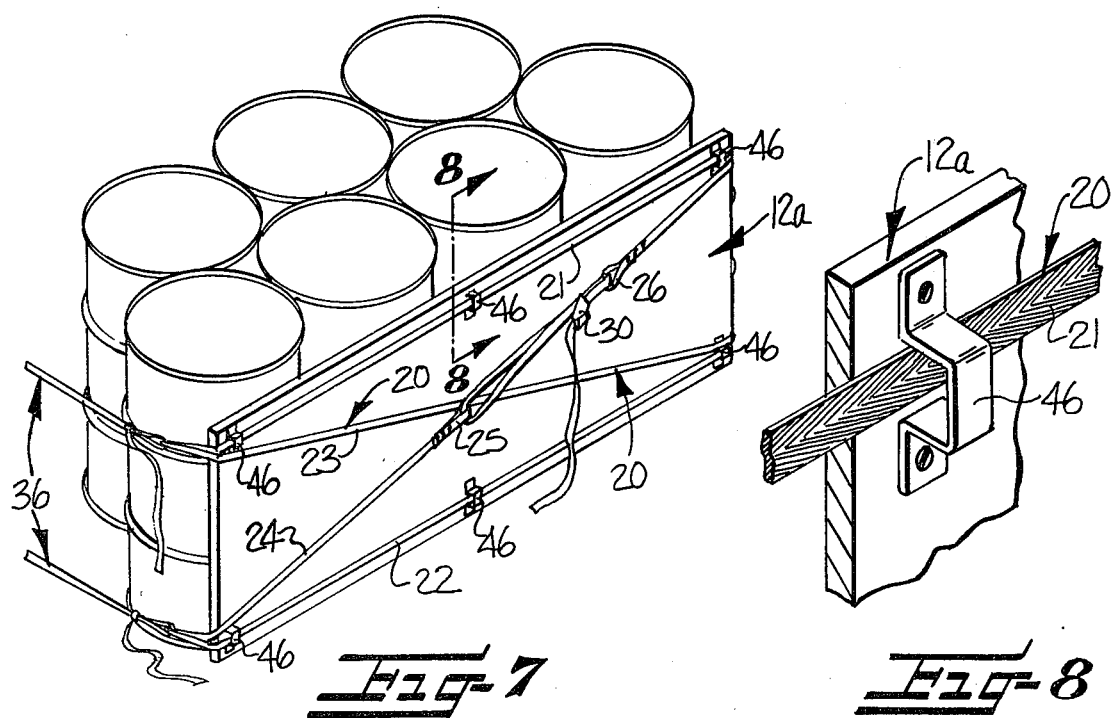

CARGO RESTRAINING APPARATUS

The present invention relates to a cargo restraining apparatus which is adapted to be secured transversely of a transport vehicle or the like to provide a bulkhead for confining and restraining a load therein during shipment.

It has long been common practice to erect wooden gates or bulkheads between sections of a load in a transport vehicle, such as a railroad car or truck trailer, in order to minimize shifting and damage to the load during shipment. Such gates or bulkheads are usually secured in place by steel straps or wooden blocks, which are nailed to the car walls. As will be apparent, this system is relatively expensive, and damage to the car walls from the nails is undesirable.

In an effort to alleviate the above problems, it has recently been proposed to fabricate a bulkhead from tape reinforced Kraft paper. To form the bulkhead, the paper is cut into two sections with a knife or scissors, and one end of each section is fastened to the car wall on respective sides of the load by a quick drying contact adhesive. The other ends of the paper sections are brought across the front of the load, and the reinforcing tapes of the two sections are interconnected. While this system results in less damage to the interior of the vehicle, the use of an adhesive on the car walls is undesirable. Also, the paper and tapes are not reusable, and it appears that the system would not be able to withstand substantial load stresses.

It is accordingly an object of the present invention to provide an improved cargo restraining apparatus and which avoids the above problems and limitations of the presently known systems.

It is a further object of the present invention to provide a cargo restraining apparatus which is relatively inexpensive, which does not result in damage to the side walls of the transport vehicle, and which is reusable.

It is still another advantage of the present invention to provide a cargo restraining apparatus which effectively spreads the supporting pressure over a relatively large area of the load, to thereby minimize potential damage to the load during shipment.

These and other objects and advantages of the present invention are achieved in the embodiments illustrated herein by the provision of a cargo restraining apparatus which comprises a rectangular panel of relatively high strength material, and a continuous flexible loading strap mounted in a general figure eight pattern on the panel. More particularly, the strap includes portions mounted along each of the two longitudinal side edges of the panel and portions crossing on one side of the panel in an X-like arrangement. The two ends of the strap are disposed adjacent to each other, preferably at the crossing portions of the strap, and so as to be securable together. Tie straps are mounted at each of the four corners of the panel for facilitating the securing of each corner to an adjacent anchoring structure in the transport vehicle or the like.

In one embodiment, the panel comprises a relatively flexible fabric material, and in another embodiment the panel comprises a relatively rigid sheet of plywood or the like. In each case, the ends of the loading strap may be interconnected by means of an adjustable belt and buckle, whereby the ends may be drawn together so as to more closely conform the panel to the contour of the adjacent load. Thus in use, the panel acts to spread the contact pressure with the load over a relatively large area, and the loading strap serves to reinforce and support the panel.

Some of the objects having been stated, other objects will appear as the description proceeds, when taken in connection with the accompanying drawings in which—

FIG. 1 is a side elevation view of a railway car having a number of cargo restraining apparatus in accordance with the present invention operatively disposed therein;

FIG. 2 is a sectional end view taken substantially along the line 2—2 of FIG. 1, and further illustrating the interior of the railway car and the placement of two cargo restraining apparatus at one end of a load;

FIG. 3 is a partially exploded, perspective view of the embodiment of the cargo restraining apparatus as shown in FIGS. 1 and 2;

FIG. 4 is a fragmentary perspective view illustrating the tie strap of the cargo restraining apparatus for securing the same to a conventional anchor pin in the wall of a railway car;

FIG. 5 is a fragmentary perspective view of a flatbed trailer having a modified cargo restraining apparatus operatively disposed thereon;

FIG. 6 is a fragmentary enlarged perspective view of one end portion of the cargo restraining apparatus shown in FIG. 5;

FIG. 7 is a perspective view of another embodiment of the cargo restraining apparatus of the present invention; and FIG. 8 is a sectional view taken substantially along the line 8—8 of FIG. 7.

Referring more particularly to the drawings, FIGS. 1-4 illustrate a portable cargo restraining apparatus 10 embodying the present invention, and which is adapted to be secured to the side walls of a railway freight car, roadway trailer or the like, for confining and restraining a load therein. In this regard, it will be understood that a number of the apparatus may be operatively disposed within a particular car to divide as well as restrain the load.

The restraining apparatus 10 comprises a rectangular panel 12 of relatively high strength flexible sheet material, and which has a pair of opposing longitudinal side edges 13, 14 and a pair of transverse side edges 15, 16. The longitudinal dimension is chosen so as to have a length to extend at least a substantial portion of the distance between the side walls of the car or trailer in which the apparatus is intended to be used.

Each of the four edges of the panel are hemmed to form an open pocket along the length thereof, and with the two ends of each pocket being open. Thus each corner of the panel includes openings to each of the two adjacent pockets. The panel 12 may be composed of a variety of relatively high strength flexible sheet materials, such as woven polyester fabric material having a polyester coating on one or both sides thereof.

The apparatus 10 further includes a continuous flexible loading strap 20 mounted to the panel in a general figure eight pattern. More particularly, the strap 20 includes longitudinal portions 21, 22 slidably mounted within the pocket along each of the two longitudinal side edges 13, 14 respectively of the panel. The remaining portions 23, 24 of the strap substantially cross on one side of the panel in an X-like arrangement, and with the two ends 25, 26 of the strap being disposed adjacent to each other on such one side of the panel so as to be securable together. In the illustrated embodiment, loops are formed at each of the two ends 25, 26 of the strap, and the looped ends are secured together by means of a separate belt and buckle 30, as best seen in FIG. 3. The belt and buckle 30 permits the two ends 25, 26 to be drawn together to adjust the length of the strap for the purposes to become apparent.

Transverse flexible straps 32, 33 are slidably mounted within the pockets along the transverse side edges 15, 16 respectively, with each end of each transverse strap having a loop formed therein which receives that portion of the loading strap 20 adjacent the associated corner of the panel 12.

In order to permit each corner of the panel to be secured to an adjacent anchoring structure in the railroad car, there is provided a tie strap 36 mounted at each of the four corners of the panel. More particularly, each tie strap 36 has a loop 38 formed at one end and which may be used for attachment of one end of the strap 36 to a conventional anchor pin 40 in the railway car, and the other free end of the tie strap 36 is threaded through the loop at the end of the transverse strap 32 or 33 at the associated corner, in the manner as best seen in FIG. 3. The free end of the tie strap 36 may then be tied off as seen in FIG. 4 to complete the interconnection. Further, it will be apparent that the manner of connecting the tie strap 36 between the panel 12 and anchor pin 40 permits the length thereof to be suitably adjusted.

To now describe the manner of use of the illustrated embodiment of the apparatus 10, it will be understood that the load L is positioned at one end of the railway car, as seen in FIG. 2. A pair of the apparatus 10 are then positioned to extend transversely across the car, with the panels 12 oriented in a vertical plane one above the other, and so as to form a temporary bulkhead which supports and confines the outer end of the load L. The tie strap 36 at each corner of each panel is secured to an anchor pin 40, and the length of the tie strap 36 is adjusted so that each panel 12 firmly engages the load. Also, the belt and buckle 30 at the front of the panel may be adjusted to draw the loading strap 20 and thus the panel into firm engagement with the load. As will be apparent, the panel 12 thereby acts to spread the contact pressure with the load over a relatively large area, to thereby minimize the opportunity for damage to the load, and the loading strap 20 serves to reinforce and support the panel. The railway car may be further loaded, with each section being secured by additional restraining apparatus, or the car may be transported with only a partial load as shown in FIG. 2.

FIGS. 5 and 6 illustrate a modified embodiment of the present invention, and wherein a rigid bar 42 is disposed along each transverse side edge of the panel. Each bar 42 includes a U-shaped notch 43 at each end thereof, which is adapted to receive the loading strap 20 therein. The bar 42 is illustrated as being removably disposed on one side of the panel 12, but it will be understood that the bar 42 alternatively could be disposed in the pocket along the transverse edges 15, 16 of the panel, and thus take the place of the flexible transverse strap 32 or 33. The rigid bar 42 acts to maintain the separation of the longitudinal side edges 13, 14 of the panel, and is particularly useful in instances where the tie straps 36 extend in a common direction. Thus for example as seen in FIG. 5, the tie straps 36 all extend downwardly to anchor pins supporting an anchor bar 44 extending along opposite sides of the floor of a flatbed trailer. It is to be understood that the cargo restraining apparatus could also be used with a closed bed truck, or other type of transport vehicle.

In the embodiment of FIGS. 7 and 8, the panel 12a comprises a rigid sheet material, such as relatively lightweight plywood sheeting. The loading strap 20 is disposed in a figure eight arrangement as described above, and is slidably attached to the panel by means of the several eyelets 46. As in the prior embodiments, the plywood panel 12a is operatively positioned against one end of the load, which as illustrated comprises a row of steel drums, with the panel 12a serving to distribute the restraining force over a relatively large area of the load. Also, the loading strap 20 serves to reinforce the plywood panel as well as provide convenient attachment points at the corners for the tie straps 36.

The embodiment of FIGS. 7 and 8 is of particular value when the load comprises drums of heavy liquid or the like. In this case, the flexible panel may permit the loading strap to bear the major portion of the force, to the point where the drums may be bent by the force of the loading strap. With the rigid panel, the force of the drums is more evenly distributed over a wider area so that the drums are not bent or otherwise damaged.

In the drawings and specification, there has been set forth a preferred embodiment of the invention, and although specific terms are employed, they are used in a generic and descriptive sense only and not for purposes of limitation.

That which is claimed is:

1. A cargo restraining apparatus secured transversely of a transport vehicle to provide a bulkhead in said vehicle during shipment, and comprising a rectangular panel of relatively high strength flexible sheet material, and having opposing upper and lower longitudinal edges and opposing transverse end edges, and with said upper and lower longitudinal edges being hemmed to form a passageway therealong and with the opposed ends of each passageway being open adjacent the respective corners of the panel, flexible loading strap means slidably mounted within said passageway along each of said upper and lower longitudinal edges of said panel and crossing on one side of said panel, said flexible loading strap means generally defining a figure eight configuration on said panel, said strap means having two ends positioned adjacent each other on said one side of said panel, and means for adjustably interconnecting said two ends, securement means connected at one end to said strap means at each of the four corners of said panel, and being connected at the other end to an adjacent anchoring structure in said transport vehicle for securing each corner of said panel thereto and in pressure contact against one side of a load to confine and restrain the load against movement during shipment, whereby said panel acts to spread the contact pressure with the load over a relatively large area, and said flexible loading strap means serves to reinforce and support said panel.

2. A cargo restraining apparatus as defined in claim 1 wherein said securement means at each corner comprises a tie strap having a loop at one end, and with the other end looped around and tied to that portion of the loading strap means at the associated corner.

3. A cargo restraining apparatus as defined in claim 1 wherein said opposing transverse end edges are hemmed to form a passageway therealong, and wherein a flexible transverse strap is slidably mounted within said passageway along each of said transverse end edges of said panel, and with opposed ends of each transverse strap being slidably interconnected to the portion of said loading strap means adjacent each of the two associated corners of said panel.

4. A cargo restraining apparatus as defined in claim 1 and further comprising a rigid spacer bar mounted along each of said transverse end edges of said panel, and with each spacer bar operatively supporting the portions of said loading strap means adjacent each of the two associated corners of said panel to maintain a fixed spacing of such portions of said loading strap.

5. A cargo restraining apparatus as defined in claim 1 wherein said means for adjustably interconnecting said two ends of said strap means comprises buckle means for permitting said two ends of said loading strap to be drawn together and interconnected in a tightened condition.

6. A cargo restraining apparatus as defined in claim 1 wherein said rectangular panel comprises a woven polymeric fabric material having a polymeric coating on at least one side thereof.

7. A cargo restraining apparatus as defined in claim 1 wherein said securement means comprises a tie strap at each of the four corners of said panel for interconnecting the same to the anchoring structure, with each tie strap being adjustable in length.

* * * * *